US006036373A

United States Patent [19]

Faass et al.

[11] Patent Number: 6,036,373

[45] Date of Patent: Mar. 14, 2000

[54] THRUST BEARING ASSEMBLY WITH EXTENDED LIP

[75] Inventors: Ian J. Faass, Burlington; Joseph F. Kenney, Jr., Winsted, both of Conn.

[73] Assignee: The Torrington Company, Torrington, Conn.

[21] Appl. No.: 09/012,467

[22] Filed: Jan. 22, 1998

[51] Int. Cl.[7] ..... F16C 19/30

[52] U.S. Cl. ..... 384/620; 384/622

[58] Field of Search ..... 384/618, 620, 384/621, 622, 623

[56] References Cited

U.S. PATENT DOCUMENTS 3,913,994 10/1975 Alling et al. ..... 384/623

4,166,662 9/1979 Chiba et al. ..... 384/622

*Primary Examiner*—David A. Bucci

*Assistant Examiner*—Brandon C. Stallman

*Attorney, Agent, or Firm*—John C. Bigler

[57] ABSTRACT

Two thrust washers, and rollers positioned between them, are held together as an assembly. One of the thrust washers has an elongated lip extending an axial length outwardly, in a direction away from the rollers and the other thrust washer, for engagement with a cylindrical piloting surface of a backup member such that piloting will be provided over an axial distance equal to the sum of the distance between thrust surfaces of the thrust washers and the axial length of the elongated lip.

5 Claims, 2 Drawing Sheets

THRUST BEARING ASSEMBLY WITH EXTENDED LIP

BACKGROUND OF THE INVENTION

This invention relates generally to thrust bearing assemblies and, more particularly, to thrust bearing assemblies providing piloting to prevent dislocation to a non-concentric position with respect to the backup members against which the thrust bearing assembly is positioned.

Conventional thrust bearing assemblies engage a piloting surface of a backup member to ensure concentricity of the thrust bearing assemblies. This piloting permits a limited amount of axial space between the thrust bearing assemblies and the backup members without loss of concentricity. The amount of axial space permitted by conventional piloting is limited by the overall axial thickness of the thrust bearing assembly or by the manufacturing limitations on forming an axially extending flange, for example. For some applications, there is a need for an improved thrust bearing assembly allowing piloting over a greater axial space without requiring increased overall axial thickness.

The foregoing illustrates limitations known to exist in present devices and methods. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the invention, this is accomplished by providing a thrust bearing assembly for receiving thrust of a first backup member against a second backup member, to be piloted by engagement with a cylindrical piloting surface of the second backup member. The thrust bearing assembly comprises a first thrust washer having a first thrust surface for engagement with the first backup member, a second thrust washer having a second thrust surface for engagement with the second backup member, rollers positioned between the first and second thrust washers, and holding means for holding the first and second thrust washers and the rollers together as an assembly. The second thrust washer has an elongated lip extending an axial length outwardly, away from the rollers and first thrust washer, for engagement with the cylindrical piloting surface of the second backup member such that piloting will be provided over an axial distance equal to the sum of the distance between the first and second thrust surfaces and the axial length of the elongated lip.

In another aspect of the invention, this is accomplished by providing a combination of a thrust bearing assembly and a backup member.

The foregoing and other aspects will become apparent from the following detailed description of the invention when considered in conjunction with the accompanying drawing figures.

BRIEF DESCRIPTION OF THE DRAWING FIGURES

DETAILED DESCRIPTION

Figure 1:
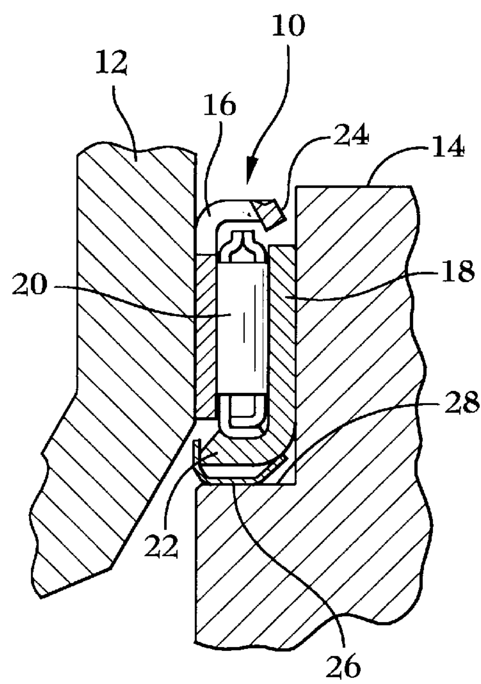
FIGS. 1, 2 and 3 are cross-sectional views illustrating prior art thrust bearing assemblies, positioned between typical backup members.

Referring now to the drawings, FIG. 1 illustrates a prior art thrust bearing assembly 10 for receiving thrust of first backup member 12 against second backup member 14, in a typical installation. For example, first and second backup members 12 and 14 might be a torque converter front cover and a turbine hub, respectively, of an automobile automatic transmission. Thrust bearing assembly 10 includes first thrust washer 16, second thrust washer 18, and caged rollers 20 positioned therebetween. The elements are held together as an assembly by lips 22 and 24 of the thrust washers.

Band 26, wrapped against the radially inward portion of thrust washer 18 engages cylindrical piloting surface 28 of second backup member 14 to pilot thrust bearing assembly 10. From the drawing, it will be apparent that piloting is limited to the axial length of band 26. That is, if first and second backup members are not positioned as illustrated but are separated axially by a distance greater than the axial length of band 26, thrust bearing assembly 10 will not be piloted by engagement with cylindrical piloting surface 28 and will be permitted to move to a non-concentric position with respect to first and second backup members 12 and 14.

Figure 2:
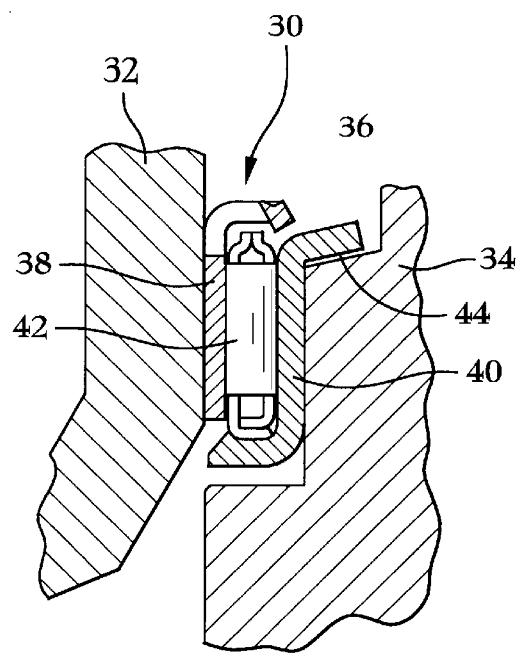

FIG. 2 illustrates a second prior art thrust bearing assembly 30 positioned between first and second backup members 32 and 34 that is piloted by engagement with cylindrical piloting surface 36 of second backup member 34. Thrust bearing assembly 30 includes first and second thrust washers 38 and 40 crimped over caged rollers 42 to form an assembly. In this second embodiment, the extent of piloting is limited by axially extending lip 44 of second thrust washer 40. If first and second backup members 32 and 34 are separated by more than the axial length of axially extending lip 44, engagement with cylindrical piloting surface 36 will no longer ensure concentricity.

Figure 3:
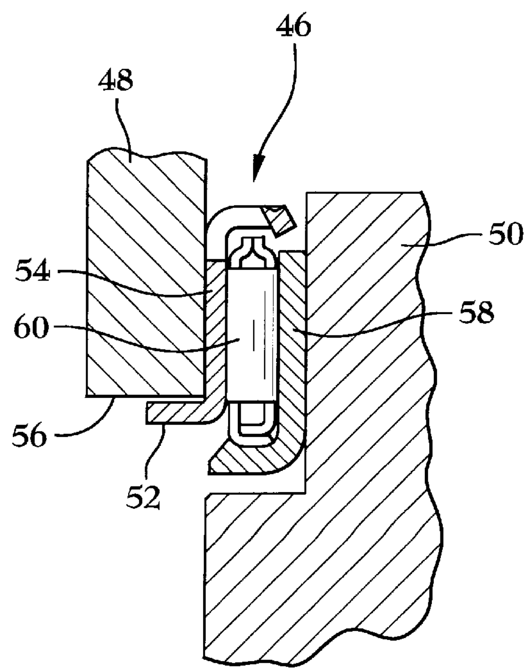

FIG. 3 illustrates a third prior art thrust bearing assembly 46, similar to the thrust bearing assembly 30 of FIG. 2, positioned between first and second backup members 48 and 50. Axially extending lip 52 of first thrust washer 54 engages cylindrical piloting surface 56 of first backup member 48. Second thrust washer 58 and caged rollers 60 complete the thrust bearing assembly, held together by crimping of the thrust washers over the bearing cage. Again, the extent of piloting is limited to the length of a radially extending lip, in this case the axial length of axially extending lip 52.

Figure 4:
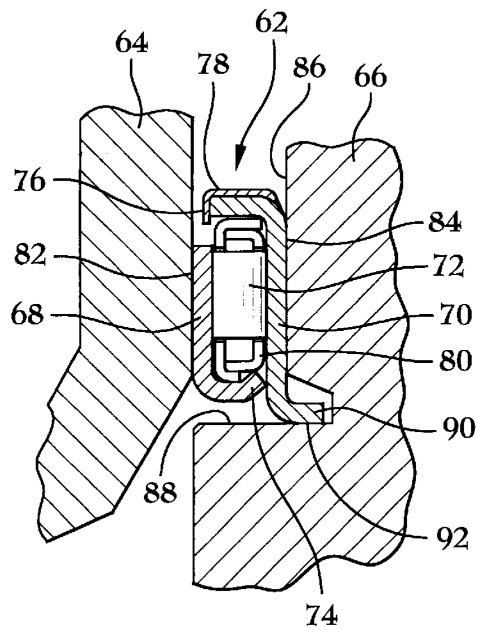
FIG. 4 is a cross-sectional view illustrating an embodiment of the thrust bearing assembly of the present invention, positioned between two backup members.

FIG. 4 illustrates thrust bearing assembly 62, an embodiment of the present invention, between first and second backup members 64 and 66, shown in an installation similar to that of FIGS. 1 and 2. Thrust bearing assembly 62 includes first and second thrust washers 68 and 70, and rollers 72 positioned therebetween. The thrust washers and rollers may be held together as an assembly by various means. In the embodiment shown, lip 74 of first thrust washer 68 and lip 76 of band 78, wrapped over second thrust washer 70, extend radially to retain cage 80, within which rollers 72 are retained. In place of band 78, second thrust washer 70 may be formed with a tab or lip similar to that of first thrust washer 54 of FIG. 3.

First and second thrust washers 68 and 70 include first and second thrust surfaces 82 and 84, respectively, engaging first and second backup members 64 and 66. Second backup member 66 includes radial thrust surface 86, against which second thrust surface 84 is positioned. Cylindrical piloting surface 88 of second backup member 66 extends axially to a plane corresponding to that of first thrust surface 82 and is recessed with respect to radial thrust surface 86 by annular groove 88, provided therebetween.

Second thrust washer 70 includes elongated lip 90 extending an axial length outwardly, that is, away from rollers 72 and first thrust washer 68. Piloting surface 92 of elongated lip 90 engages cylindrical piloting surface 88 of second backup member 66 to ensure concentricity of thrust bearing assembly 62 with respect to second backup member 66. Elongated lip 90 extends into annular groove 92 of second backup member 66 such that second thrust surface 84 is allowed to engage radial thrust surface 86 of second backup member 66.

Figure 5:
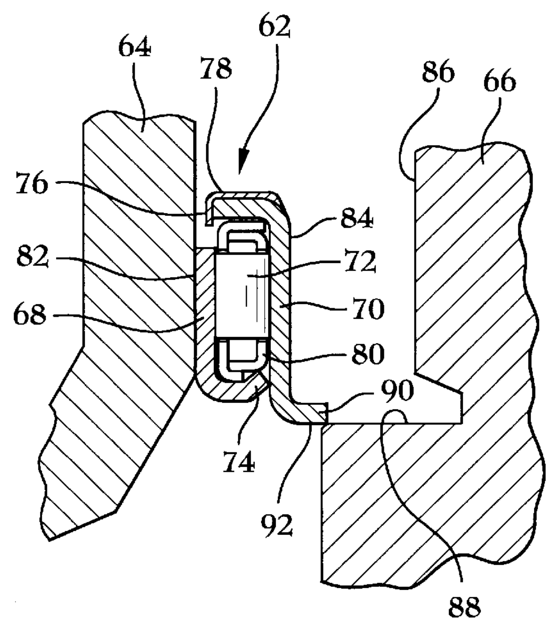
FIG. 5 is a cross-sectional view corresponding to FIG. 4 illustrating the increased piloting length of the embodiment of FIG. 4.

FIG. 5 illustrates that the present invention provides piloting over an axial distance equal to the sum of the offset of the second thrust surface 84 (measured with respect to the cylindrical piloting surface 88) and the axial length of the elongated lip 90. This increased piloting distance permits larger variations in spacing of backup members without thrust bearing assemblies becoming non-concentric with respect to the backup members. Because the length of an axially extending lip is limited by manufacturing technology, previous thrust bearing assemblies are unable to achieve the same amount of pivoting.

Significantly, thrust bearing assembly 62 of the present invention may provide piloting along a radially inward surface of elongated lip 90 or along a radially outward surface of a similar elongated lip. As illustrated in FIG. 4, second thrust washer 70 extends radially inwardly along second thrust surface 84 to a minimum diameter and then extends axially along the minimum diameter as elongated lip 90 such that elongated lip 90 has a radially inward surface for engagement with cylindrical piloting surface 88 of second backup member 66.

Figure 6:
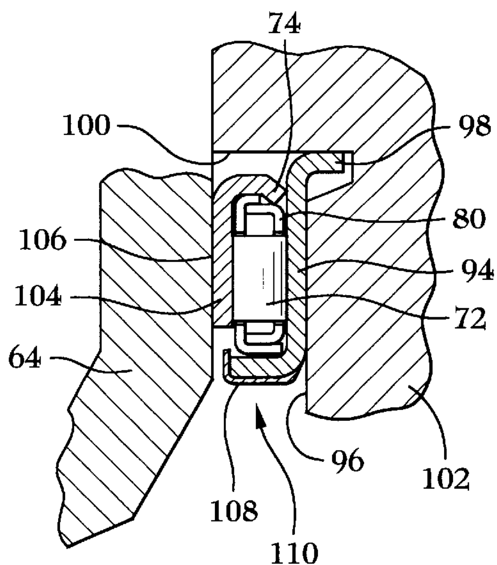
FIG. 6 is a cross-sectional view illustrating another embodiment the thrust bearing assembly of the present invention.

As illustrated in FIG. 6, second thrust washer 94 extends radially outwardly along second thrust surface 96 to a maximum diameter and then extends axially along the maximum diameter as elongated lip 98 such that elongated lip 98 has a radially outward surface for engagement with cylindrical piloting surface 100 of second backup member 102. First thrust washer 104, similar to first thrust washer 68, has first thrust surface 106 and lip 74. Band 108, similar to band 78, cooperates with lip 74 to hold the elements together as thrust washer assembly 110.

Note that the overall thickness of the thrust bearing assembly of the present invention may be small, facilitating a close axial spacing of the first and second backup members. First backup member 64 may be configured such that elongated lip 90 will interfere with a desired axial spacing between the backup members if the thrust bearing assembly is installed backwards, that is, with elongated lip 90 facing first backup member 64. In this way, the thrust bearing assembly of the present invention may provide an anti-reversal feature.

Having described the invention, what is claimed is:

1. A combination of a thrust bearing assembly and backup member comprising:

a first thrust washer of the thrust bearing assembly having a first thrust surface;

a second thrust washer of the thrust bearing assembly having a second thrust surface abutting a radial thrust surface of the backup member;

rollers of the thrust bearing assembly positioned between the first and second thrust washers;

holding means of the thrust bearing assembly for holding the first and second thrust washers and the rollers together as an assembly;

the backup member having a cylindrical piloting surface offset with respect to the radial thrust surface and extending axially away from the radial thrust surface of the backup member; and the second thrust washer having an elongated lip extending an axial length outwardly, away from the rollers and first thrust washer, for engagement with the cylindrical piloting surface of the backup member such that piloting will be provided over an axial distance greater than the axial length of the elongated lip.

2. The combination of a thrust bearing assembly and a backup member according to claim 1, wherein the second thrust washer extends radially inwardly along the second thrust surface to a minimum diameter and extends axially along the minimum diameter as the elongated lip, the elongated lip having a radially inward surface for engagement with the cylindrical piloting surface of the second backup member.

3. The combination of a thrust bearing assembly and a backup member according to claim 1, wherein the second thrust washer extends radially outwardly along the second thrust surface to a maximum diameter and extends axially along the maximum diameter as the elongated lip, the elongated lip having a radially outward surface for engagement with the cylindrical piloting surface of the second backup member.

4. The combination of a thrust bearing assembly and a backup member according to claim 1, wherein the rollers are retained within a bearing cage and the holding means includes engagement means on the first and second thrust washers for engagement with the bearing cage.

5. The combination of a thrust bearing assembly and a backup member according to claim 1, wherein the holding means includes a band wrapped around the second thrust washer, the band preventing separation of the second thrust washer and the bearing cage.

* * * * *